Sept. 19, 1961 J. E. REIDER 3,001,074
MEASURING SYSTEM
Filed Oct. 31, 1958 2 Sheets-Sheet 1

INVENTOR
James E. Reider
By Anthony D. Cennamo

United States Patent Office 3,001,074
Patented Sept. 19, 1961

3,001,074
MEASURING SYSTEM
James E. Reider, Columbus, Ohio, assignor to Industrial Nucleonics Corporation, a corporation of Ohio
Filed Oct. 31, 1958, Ser. No. 770,973
9 Claims. (Cl. 250—83.6)

This invention relates to gauging apparatus for determining the physical dimensions of a workpiece and particularly to a nuclear radiation gauge for measuring the longitudinal and lateral dimensions of heavy materials.

In the process of steelmaking, molten steel is poured into cast iron molds to form ingots. At temperatures of several thousand degrees Fahrenheit, these bulky ingots are converted into a variety of more workable semifinished forms by huge rollers. Depending upon the ultimate product, these semifinished shapes may be categorized as a bloom, a billet or a slab.

Specifically, a steel slabbing mill produces semi-finished forms of steel upon which subsequent rolling operations are performed. Through the agency of a multiplicity of reducing rollers, a given slab may be transformed into a continuous strip of steel several times the length of the original slab. Obviously, the length of the final steel strip is dependent upon the dimensions of the original workpiece and the amount of reduction effected by the various mill passes. Accordingly, a reliable indication of output strip footage may be had by measuring the size of slabs before they are passed through the mill.

Inasmuch as the thickness of each steel slab is maintained at a substantially constant value by the final set of ingot working rolls, it is only necessary to determine the lateral and longitudinal dimensions of a given slab. Fomerly, one method involved placing a rod across the hot slab to produce a charring thereof. The length of the scored portion was indicative of the width of the slab. A similar procedure was adopted to measure the length of the slab. Since this method required human operating personnel in intimate relationship with the slab as well as a large supply of combustible material, this approach is hazardous and uneconomical.

Prior to the present invention, numerous contacting and photodetecting devices have been proposed to provide the above dimensional information. However, proper operation of these devices is severely impaired by the predominance of dirt, grease, heat and water in such a process. These instrument must be ruggedly constructed and suitably shielded to cope with this adverse environment. At best, these devices provide only a rough approximation of stock dimension while requiring a substantial financial outlay for a given installation. Measuring apparatus of these types do not provide sufficient returns to the investor to justify the expense required for installation and servicing.

In response, therefore, to the demand for an economical, compact gauge capable of reliably indicating slab dimensions, nothwithstanding the accompanying hazardous environment of a steel mill, the present invention resulted. According to a typical embodiment, a source of nuclear radiation is mounted adjacent a Geiger-Mueller tube and each is positioned adjoining opposing surfaces of a generally rectangular steel slab. The physical position of the radiation source and G-M tube define a measuring station which is spaced a predetermined distance from a fixed reference point. One edge of the slab is adapted to engage the reference point while the alternate edge is positioned between the radiation source and G-M tube. In this manner, the amount of radiation impinging upon the G-M tube will be a function of the lateral extension of the slab from the reference point. Suitable recorders are then utilized to provide an indication of such measurement.

Accordingly, it is a primary object of the present invention to provide method and means for measuring the lateral and longitudinal dimensions of a workpiece being processed under a hazardous environment.

It is another object of the present invention to provide a gauging device capable of non-destructive measurement of the physical dimensions of an inaccessible workpiece.

It is still another object of the present invention to provide a gauging device which measures the physical dimensions of an inaccessible workpiece with a higher degree of precision than similar devices used heretofore.

It is an additional object of the present invention to provide a gauging device that may be easily adjusted to measure any size workpiece.

A still further object of the present invention is to provide a gauging device which may be easily adapted to existing productions lines and is less expensive to manufacture and more economical to maintain than previous devices.

Supplemental objects and features of the present invention will become more apparent upon reference to the following specification taken in conjunction with the appended drawings in which.

Figure 1:
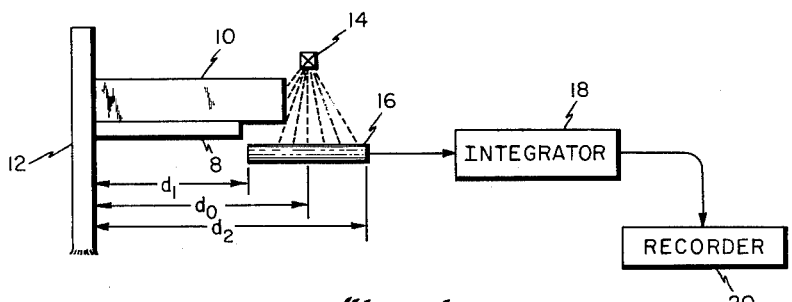
FIG. 1 is a diagrammatic view of a workpiece measuring system employing novel radiation techniques.

With specific reference to FIG. 1, a workpiece 10 is supported by a work table 8 and positioned against a stationary abutment 12. At a predetermined distance $d_0$ from the abutment 12, a nuclear source of radiation 14 such as cesium 137 is mounted adjacent the upper surface of the workpiece 10. Adjoining the underside of the workpiece 10, a Geiger-Mueller tube 16, having a longitudinal axis parallel to the surfaces of the workpiece 10 and perpendicular to the abutment 12, is mounted to receive radiant energy from the source 14. The output of the G-M tube 16 is connected to an integrator 18 which is in turn coupled to a recorder 20. Representative distances $d_1$ and $d_2$ from the abutment 12 serve to define the physical length of the G-M tube 16. Hereinafter, subsequent reference to distance shall be understood to be taken with respect to the abutment 12.

Analysis shows that of the total radiation emanating from the source 14 and directed toward the G-M tube 16, only a portion impinges upon the G-M tube. The remaining energy is expended in traversing the molecular structure of the workpiece 10. If the workpiece 10 is assumed to be of sufficient thickness to absorb substantially all the radiation passing therethrough, the amount of radiation being emitted from the underside of the workpiece 10 approaches zero. Accordingly, if the workpiece 10 extends over one-half of G-M tube 16, the G-M tube will intercept essentially one-half the radiation it would have received if it were completely exposed to the emanations of source 14. In addition, an increase in lateral extension of the slab 10 would effect a reduction in the amount of detected radiation. Thus, it may be observed that the detector response is inversely proportional to workpiece length.

Figure 2:
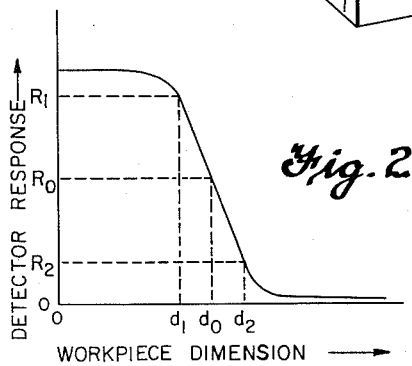
FIG. 2 is a graphical illustration of the response of the system of FIG. 1 to changing workpiece dimension.
Figure 3:
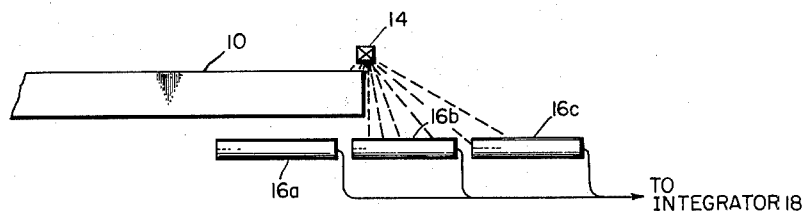
FIG. 3 is a diagrammatic view similar to FIG. 1 but showing a plurality of detectors.
Figure 4:
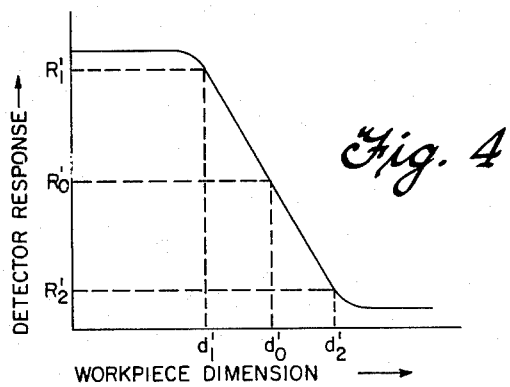
FIG. 4 is a graphical illustration of the response of the system in FIG. 3 to changing workpiece dimension.

In FIG. 2, it may be observed that the response of the G-M tube varies significantly with changing length of the workpiece 10. According to the graph, if a given workpiece 10 extends a distance from the abutment 12 equivalent to $d_0$, the G-M tube response is $R_0$. When a shorter workpiece 10 of length $d_1$ is placed in the measuring gap the response of the G-M tube increases to the value $R_1$. Alternately, if a longer workpiece of length $d_2$ is inserted in the measuring gap, a considerable reduction in detector response to the value $R_2$ occurs. It may be noticed that the coordinates $(d_1, R_1)$ and $(d_2, R_2)$ define two distinct points on the linear portion of the response curve and that points on the curve corresponding to workpiece dimensions respectively less than or greater than $d_1$ or $d_2$ are situated upon those portions of the curve having either rapidly changing or zero slopes. Thus, reliable length measurements are possible only when the outer edge of the workpiece 10 lies between the radioactive source 14 and the G-M tube 16. The measurement span is then limited by the actual length of the G-M tube 16. However, if the present invention is to be engaged to measure a workpiece whose dimensions are subject to wide variance, it may be desirable to extend the effective range by employing a plurality of radiation sources and Geiger-Mueller tubes in a collinear arrangement. Referring to FIGS. 3 and 4, radiation detectors 16a, 16b and 16c are horizontally positioned on the same axis to increase the effective measuring length of the system. The outputs of the detectors are combined by connecting them in parallel circuit relationship and integrating as explained in FIG. 1. The result is noted in FIG. 4 as an increase in the measurable response of the system to workpiece dimension. The span of measurement now extends over a much larger interval $d_1'$ to $d_2'$.

Figure 5:
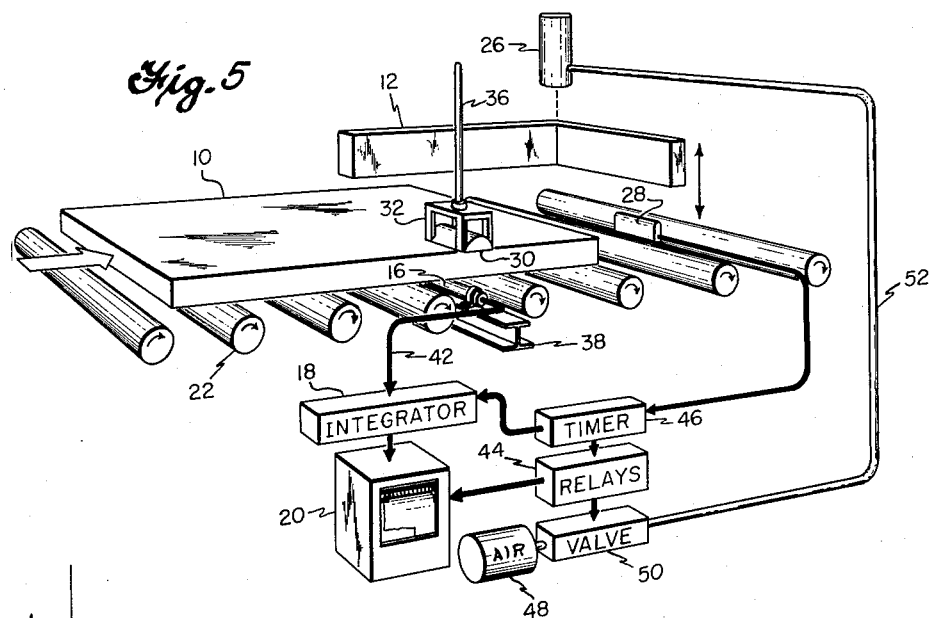
FIG. 5 illustrates a preferred embodiment of the present invention.

In explaining a practical application of the above principles, FIG. 5 is quite useful. With reference to FIG. 5, a plurality of rollers 22 are adapted to transport a hot steel slab 10 in the direction indicated by the large arrow. A heavy piece of heat resisting stock is fabricated to form a stopgate 12 which is vertically movable by means of a pneumatic driving device 26 to engage each slab as it progresses from left to right. A microswitch 28 is fixedly disposed in yieldable engagement with the slabs 10 and electrically connected to the recorder 20 via a timer 46 and a relay network 44.

The gauge assembly per se comprises a holder 30 for retaining the radioactive source 14, and a G-M tube 16. A bracket 32 is fastened to the source holder 30 and a pipe 36 may be extended from the ceiling or an overhead girder and bolted to the bracket 32 for suspending the source unit above the edge of the slab 10. The fragile G-M tube 16 may be encased in a section of metal conduit for potection. The G-M tube 16 may be strapped to an I-beam 38, base mounted between a pair of adjacent rolls 22. Since there is not usually a significant gradient in the width of a given slab, the gauging apparatus may be mounted at any convenient point along the conveyor insofar as it is enable to "sight" the outer edge of each stopped slab.

Continuing with this example, the output of the G-M tube 16 may be coupled by a conductor 42 to the integrator 18. The relay network 44 is connected to timer 46 for controlling the recorder 20 and the stopgate 12. Timer 46 is also connected to the integrator 18 for controlling its operation. In a typical embodiment, the relays 44 serve to actuate a solenoid valve 50 for admitting compressed air from a reservoir 48 to a conduit 52 connected to the stopgate drive mechanism 26.

Figure 6:
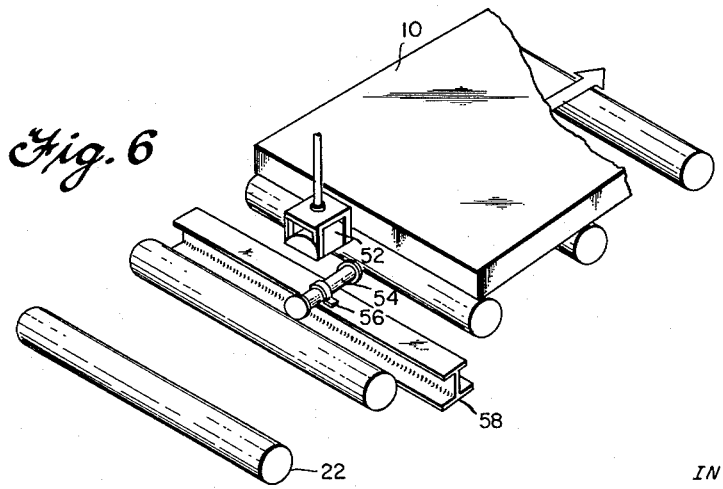
FIG. 6 is a pictorial view of a modification of the preferred embodiment shown in FIG. 5.

In the operation of the hereinabove described apparatus, a slab of steel engages the microswitch 28 energizing the valve 50 to lower the stopgate 12. In addition, integrator 18 is energized by the timer 46 so that current flowing through the G-M tube 16 is integrated therein. After several seconds, a signal potential indicative of slab width is developed. The timer 46 controls the time duration of integration so that sufficient signal potential is developed to operate the recorder 20. Obviously, the time of integration is maintained at a substantially constant value to continually provide an accurate measurement of slab width. The timer also functions to read out the integrated potential to the recorder 20 after the period of integration has elapsed. In a manner well known to those skilled in the art, the pen of the recorder 20 will be laterally displaced in accordance with the amplitude of the integrated signal potential. When the timer 46 "times out," relays release the air valve 50 allowing the stopgate 12 to be retracted to a raised position. The slab 10 then continues on its journey through the mill. Timing out of timer 46 also causes the input of recorder 20 to be clamped to zero and the integrator to be disabled. This insures that there will be no indication of integrator output during the time an absorber is absent from the measuring gap and when signal integration is occurring. As soon as another slab is checked by the stopgate 12, the above cycle is repeated. With reference now to FIG. 6, another source of radiation 52 and a detector 54 may be used to determine the longitudinal dimension of the slab 10 from the stopgate 12. In this case, the detector is rigidly positioned perpendicular to an adjacent vertical edge of the slab 10 by strapping it at 56 to a girder 58. The source unit mounting 52 is similar to that described hereinabove. And, the operation of this modification should be apparent from the foregoing description.

Although the foregoing example describes a width gauge, it should be apparent that a second gauge may be stationed adjacent the trailing edge of the slab 10 to determine slab length. Inasmuch as the radiation source and Geiger tube may be easily shielded from the atmosphere, cooling of the gauging apparatus may be facilitated by directing a stream of water thereupon. This method of cooling is additionally advantageous in that contamination of the source unit by foreign matter is avoided and the gauge is conveniently maintained in spotless working condition.

Numerous modifications and variations of the invention as hereinbefore set forth may be made without departing from the spirit and scope of the invention or sacrificing any of its attendant advantages.

I claim:

1. Apparatus for measuring a physical dimension of a generally rectangular workpiece comprising a nuclear source of radiation positioned at one edge of said workpiece on one side thereof, a detector positioned on the other side of said workpiece in alignment with said radiation source for producing an electrical current in response to said radiation from said source, means for spatially fixing a second edge of said workpiece at a predetermined distance from said source and said detector, said edges defining at least one dimension of said workpiece, integrating means connected to said detector for producing an electrical potential, and display means connected to said integrating means responsive to the amplitude of said integrated potential.

2. Apparatus as set forth in claim 1 in which said detector comprises at least one Geiger-Mueller tube having a longitudinal axis perpendicular to said edges of said workpiece.

3. Apparatus as set forth in claim 1 in which said workpiece is of sufficient thickness to absorb substantially all of said radiation impinging thereupon.

4. Apparatus as set forth in claim 1 in which said detector comprises a plurality of adjoining G-M tubes having a common axis.

5. In a steel forming process wherein a rectangular steel slab is unidirectionally transported by a roller conveyor, measuring apparatus comprising: a source of nuclear radiation positioned adjacent one side of said slab, a G-M tube, means for mounting said G-M tube perpendicular to a first edge of said slab and in alignment with said source for receiving radiation, said source and said G-M tube defining a measuring station, means for passing said slab between said source and said G-M tube, means for stopping said slab in said measuring station, said last named means further including locating means to affix a second edge of said slab at a predetermined distance from said measuring station, said G-M tube adapted to generate an output current proportional to the radiation impinging thereupon, an integrator, means for connecting said integrator to said G-M tube for developing an electrical potential having an amplitude indicative of the linear distance between said edges of said slab.

6. In a steel forming process wherein a rectangular steel slab is unidirectionally transported by a continuous roller conveyor, measuring apparatus comprising: a nuclear source of radiation positioned adjacent one surface of said slab, a Geiger-Mueller tube, means for mounting said G-M tube perpendicular to a variable edge of said slab in alignment with said source for receiving radiation therefrom, said source and said G-M tube further defining a measuring gap, means for passing said slab between said source and said G-M tube, integrator means connected to said G-M tube for generating an output potential, recorder means connected to said integrator means for indicating the amplitude of said integrator output potential, switch means positioned after said measuring gap in yieldable engagement with said slab, means responsive to said switch means for temporarily halting said unidirectional movement of said slab when it is positioned in said measuring gap, said switch means being connected to said integrator for energizing the same, means for disconnecting said integrator from said G-M tube after a predetermined period, said last named means further including means for automatically releasing said halted slab after said predetermined period.

7. In a steel forming process wherein a rectangular steel slab is unidirectionally transported by a continuous roller conveyor, measuring apparatus comprising: a nuclear source of radiation positioned adjacent one surface of said slab, a Geiger-Mueller tube, means for mounting said G-M tube perpendicular to a variable edge of said slab in alignment with said source for receiving radiation therefrom, said source and said G-M tube further defining a measuring gap, means for passing said slab between said source and said G-M tube, integrator means connected to said G-M tube for generating an output potential, recorder means connected to said integrator means for indicating the amplitude of said integrator output potential, switch means positioned after said measuring gap in yieldable engagement with said slab, said switch means connected to said integrator for energizing the same, means for disconnecting said integrator from said G-M tube after a predetermined period, a stopgate normally positioned above said conveyor adapted to halt said slab at a predetermined distance from said measuring gap, reversible drive means connected to said stopgate, actuator means for energizing said drive means, means for connecting said switch means to said actuator means for lowering said stopgate when said slab is within said measuring gap, said actuator means operative to automatically release said drive means after said predetermined period.

8. Apparatus for measuring a dimension of a rectangular workpiece comprising means for abutting a vertical edge of said workpiece against a stationary object, means for directing a beam of nuclear radiation toward one surface of said workpiece extending horizontally of said edge, means for detecting the radiation at the opposite surface of said workpiece away from said abutted edge, said detected radiation being inversely proportional to the extent of said surface from said abutted edge, and means for rendering an indication of said detected radiation.

9. Apparatus substantially as set forth in claim 8 which further includes means for abutting an adjacent vertical edge of said workpiece against a said stationary object, means for directing a second beam of nuclear radiation toward said same surface of said workpiece, means for detecting the radiation at said same opposite surface of said workpiece away from said second abutted edge, said detected radiation being inversely proportional to the extent of said surface from said second abutted edge, and means for rendering an indication of said detected radiation.

References Cited in the file of this patent

UNITED STATES PATENTS

| | | |
|---|---|---|
| 2,237,811 | Cockrell | Apr. 8, 1941 |
| 2,323,128 | Hare | June 29, 1943 |
| 2,730,006 | Gottschall | Jan. 10, 1956 |
| 2,790,945 | Chope | Apr. 30, 1957 |
| 2,791,931 | Summerhayes | May 14, 1957 |
| 2,810,316 | Snyder | Oct. 22, 1957 |

FOREIGN PATENTS

| | | |
|---|---|---|
| 699,129 | Great Britain | Oct. 28, 1953 |